Nov. 3, 1970     M. A. GOSSIE ETAL     3,537,833
METHOD FOR PRODUCING HOLLOW GLASS SPHERES
Filed March 18, 1968

INVENTORS.
MIJO A. GOSSIE
WILLIAM R. WISNER
BY
Charles W. Gregg
AGENT 3,537,833
METHOD FOR PRODUCING HOLLOW GLASS SPHERES Mijo Albert Gossie, Corning, and William R. Wisner, Big Flats, N.Y., assignors to Corning Glass Works, Corning, N.Y., a corporation of New York
Filed Mar. 18, 1968, Ser. No. 713,727
Int. Cl. C03b 19/10
U.S. Cl. 65—21
2 Claims

ABSTRACT OF THE DISCLOSURE

A method of making hollow glass spheres from hollow glass blanks including a partially spherical bulbar portion and an extending tubular portion connected with an opening between these portions. Said tubular portion is heated to the softening point temperature of the glass and is pulled away from said bulbar portion to cause the opening in the tubular portion to close and such tubular portion to finally separate from the bulbar portion. Vacuum is thereafter selectively applied to the bulbar portion at said point of separation from the tubular portion to draw on the bulbar portion at said point of separation and cause it to conform to the partially spherical shape of the remainder of the bulbar portion.

BACKGROUND OF THE INVENTION

This invention relates to a method of making hollow glass spheres from hollow glass blanks, such as Christmas tree ornament blanks for example, having a partially spherical bulbar portion and a hollow neck or tubular portion extending from the bulbar portion.

BRIEF DESCRIPTION OF THE DRAWINGS

In the drawings.

Similar reference characters refer to similar parts in each of the figures of the drawings.

PREFERRED EMBODIMENT OF THE INVENTION

Figure 1:
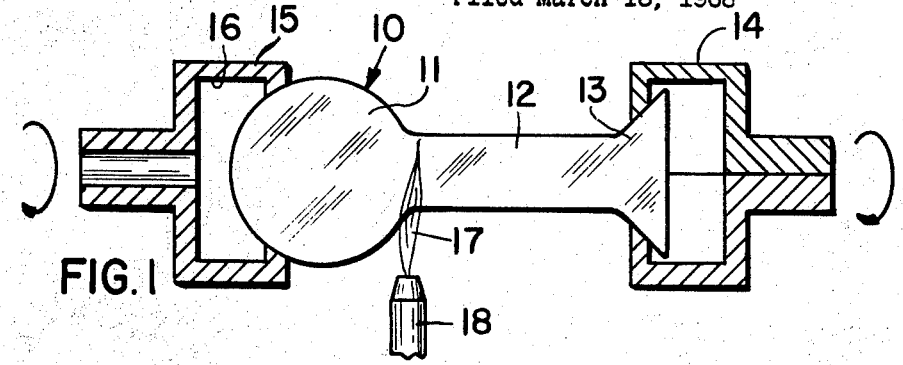
FIGS. 1 through 5 illustrate a progressive series or succession of steps for forming hollow glass spheres in accordance with the invention.

Referring to the drawings in detail, there is shown in FIG. 1 a hollow glass blank 10 having a partially spherical bulbar portion 11 and a hollow neck or tubular portion 12 extending from the bulbar portion, the channel extending through such tubular portion connecting with the hollow in said bulbar portion through an opening between these portions. The free end 13 of said tubular portion is preferably flared as shown so that it can be disposed in a chuck such as 14 and a pulling force can be supplied thereto as hereinafter further discussed. However, if a chuck is provided which is suitable for tightly gripping the unflared end of a tubular portion, such as 12, for the application of said pulling force thereto, the tubular portion need not have a flared end.

The bulbar portion 11 of blank 10 is disposed in a vacuum chuck 15 as shown in FIGS. 1 through 5 of the drawings and vacuum or negative pressure is supplied to the hollow 16 in such chuck to hold said bulbar portion and, thereby, said blank securely in chuck 15. Such vacuum chucks are well known in the art. Chucks 14 and 15 are then synchronously rotated at a speed on the order of 450 revolutions per minutes, for example, and in corresponding directions as indicated by the arrows in the drawings. During the rotation of chucks 14 and 15 and, thereby, glass blank 10, heat is supplied to tubular portion 12 of blank 10, adjacent to or in the region of the bulbar portion 11 of the blank, to heat the glass of which the blank is made to the softening point temperature of the glass in said region. The heat is preferably supplied to said portion 12 of blank 19 by a flame 17 provided by a gas burner such as 18 as shown in FIG. 1.

Figure 2:
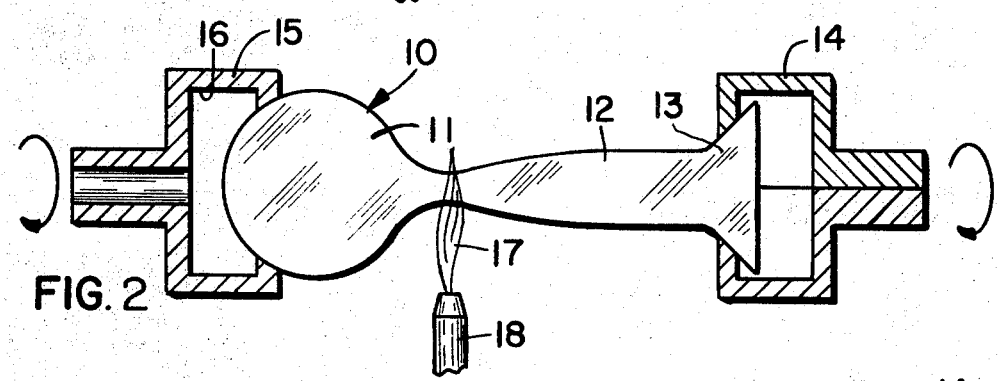

As illustrated in FIG. 2, following the heating of blank 10 to the softening point temperature of the glass as illustrated in FIG. 1, one or both chucks 14 and 15 are moved in directions away from each other to cause the heated region of tubular portion 12 of blank 10 to reduce in diameter or "neck down" and finally close the channel in such tubular portion. At such time burner 18 is also moved as shown in FIG. 2 so that it will continue to impinge on tubular portion 12 of blank 10 during said movement of one or both of the chucks 14 and 15 away from each other. Rotation of chucks 14 and 15 is continued during the movement of the chucks away from each other.

Figure 3:
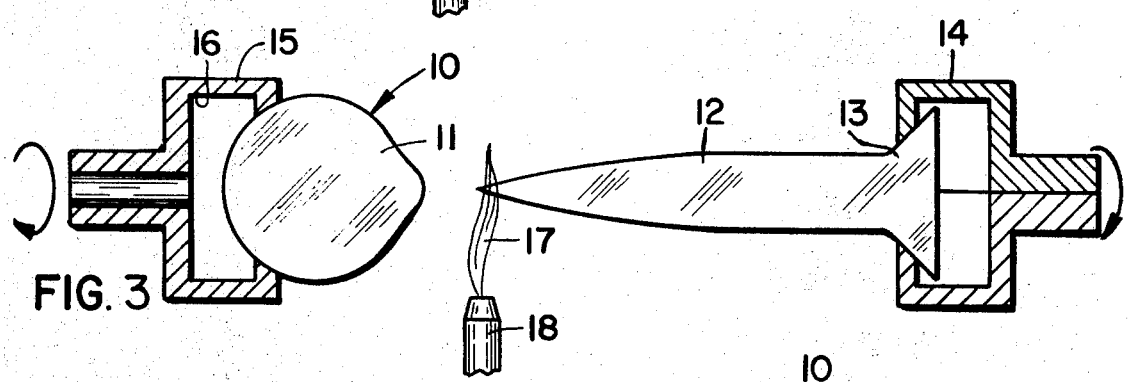

As illustrated in FIG. 3, the continued movement of one or both chucks 14 and 15 away from each other will finally cause tubular portion 12 to separate from bulbar portion 11 with the openings at the point of separation and extending into each respective portion being closed since, as previously mentioned, the channel through tubular portion 12 was caused to close during the initial movement of chucks 14 and 15 away from each other. During said continued movement of chucks 14 and 15 away from each other, rotation of chucks 14 and 15 is continued and burner 18 is again moved so that it will continue to impinge on tubular portion 12 until such portion becomes separated from bulbar portion 11 as shown in FIG. 3.

Figure 4:
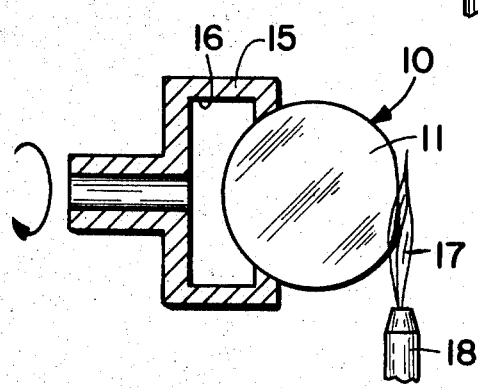

Subsequent to the separation of bulbar portion 11 and tubular portion 12 as shown in FIG. 3, burner 18 is moved, as shown in FIG. 4, so that flame 17 now impinges on bulbar portion 11 in the region thereof formerly connected with tubular portion 12. Rotation of portion 11 is continued at such time and the glass in said region is thereby reheated to the softening point temperature of the glass of which blank 10 is made. It will be noted that the separation of portions 11 and 12 of blank 10 as shown in FIG. 3 and the reheating of the glass in the region of bulbar portion 11 where it was formerly connected with tubular portion 12 causes the glass in said region to generally flatten out. This is due to the surface tension of the reheated glass and to the partial cooling of bulbar portion 11 and a consequential partial vacuum occurring in the hollow of such portion due to corresponding partial cooling of the air in such hollow.

Figure 5:
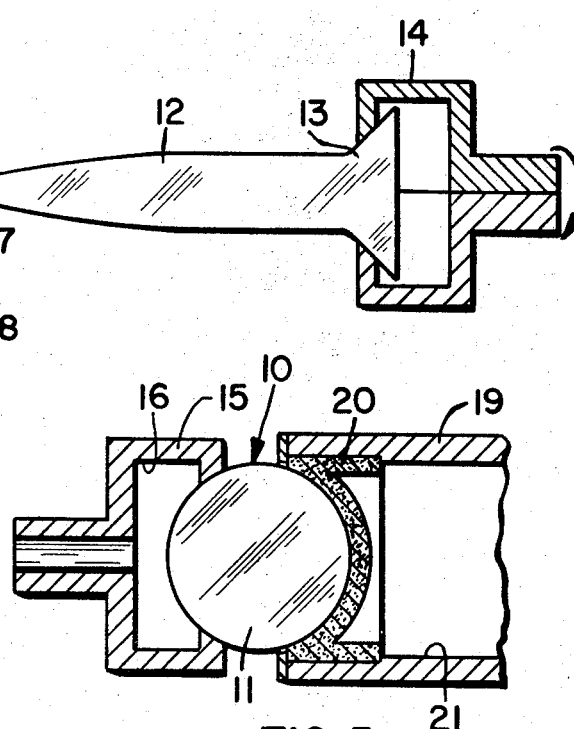

After reheating of said region of bulbar portion 11 to the softening point temperature of the glass, rotation of chuck 15 is discontinued and a vacuum mold such as 19 embodying a vacuum chamber 21, and a glass-contacting porous insert portion 20, is disposed adjacent or about said region of bulbar portion 11 as shown in FIG. 5. The porosity of portion 20 of vacuum mold 19 is attained either by using a porous metal or other similar porous material for said insert or by providing the insert with a plurality of minute perforations (not shown) which extend from vacuum chamber 21 of mold 19 through the face of the insert, or by a combination of such methods. Said face of the insert is provided with a concave curvature corresponding to the spherical curvature of the remainder of bulbar portion 11. Insert portion 20 is otherwise hermetically sealed within vacuum mold 19. Vacuum or negative pressure is then supplied to chamber 21 in mold 19 and is thereby supplied through the porous material of insert 20, or through said perforations in insert 20, to the glass in said reheated region of bulbar portion 11 to cause such glass to be drawn into contact with said face of the insert and conform to the concave curvature thereof. Thereafter bulbar portion 11 is permitted to cool so that the glass in the reheated region thereof will become set-up thereby completing the making of the desired hollow sphere. The vacuum in hollow 16 of the chuck 15 is then discontinued and the completed hollow sphere is then removed from such chuck. The apparatus can then be similarly employed for making another hollow glass sphere, as is obvious.

Although there is herein shown and described in any detail only one specific example of practicing the method of the present invention, it will be understood that various changes and modifications can be made in the method disclosed without departing from the spirit and scope of the invention.

What is claimed is:

1. The method of making a hollow glass sphere from a hollow glass blank including a partially spherical bulbar portion and an extending tubular portion connected with an opening between said portions, such method comprising:

(A) heating said tubular portion in the region thereof adjacent said bulbar portion to the softening point temperature of the glass, (B) pulling said portions away from each other to cause the opening in said region of said tubular portion to close and such tubular portion and the bulbar portion to finally separate from each other, (C) reheating said bulbar portion in the region thereof previously connected with said tubular portion to the softening point temperature of the glass, (D) disposing about said region of said bulbar portion a vacuum mold face or porous material and having a concave curvature corresponding to the curvature of the remainder of such bulbar portion, (E) applying vacuum through said mold face to said reheated region of said bulbar portion to cause such region to conform to said concave curvature of said mold face and thereby complete the forming of said sphere, and (F) thereafter permitting the glass of said sphere to cool and become set-up.

2. The method of making a hollow glass sphere from a hollow glass blank including a partially spherical bulbar portion and a tubular portion extending from such bulbar portion connected with an opening between said portions, such method comprising, (A) heating said tubular portion in the region thereof where it joins said bulbar portion to the softening point temperature of the glass, (B) progressively separating said portions to cause the glass in said region of said tubular portion to draw down and close over the opening into said bulbar portion, (C) reheating the glass which closes over said opening in the bulbar portion to the softening point temperature of the glass, (D) disposing adjacent said reheated glass a vacuum mold face of porous material and having a concave curvature corresponding to the curvature of the remainder of said bulbar portion and then applying vacuum through said mold face to said reheated glass, and (E) continuing the application of said vacuum while permitting said bulbar portion to cool to complete said hollow glass sphere.

References Cited

UNITED STATES PATENTS

| | | | |
|---|---|---|---|
| 2,352,957 | 7/1944 | Kell | 65—110 |
| 2,790,994 | 5/1957 | Cardot et al. | 65—110 |
| 3,288,585 | 11/1966 | Clarke | 65—21 |

S. LEON BASHORE, Primary Examiner

E. R. FREEDMAN, Assistant Examiner

U.S. Cl. X.R.

65—34, 105, 109, 110, 270, 271, 276